(12) United States Patent
Muirhead

(10) Patent No.: US 6,588,826 B1
(45) Date of Patent: Jul. 8, 2003

(54) RIGID COVER ASSEMBLY FOR A PICKUP TRUCK

(76) Inventor: Scott Arthur William Muirhead, Surrey (CA)

( * ) Notice: Subject to any disclaimer, the term of this patent is extended or adjusted under 35 U.S.C. 154(b) by 0 days.

(21) Appl. No.: 10/137,787

(22) Filed: May 2, 2002

Related U.S. Application Data

(63) Continuation-in-part of application No. 09/785,835, filed on Feb. 20, 2001, now abandoned.
(60) Provisional application No. 60/185,852, filed on Feb. 29, 2000.

(51) Int. Cl.$^7$ ................................................. B60P 7/02
(52) U.S. Cl. ........................... 296/100.06; 296/100.18; 296/100.07
(58) Field of Search ....................... 296/100.06, 100.1, 296/100.07, 100.18, 100.17, 100.08, 100.02, 100.09, 98, 37.6, 39.2

(56) References Cited

U.S. PATENT DOCUMENTS

| | | | | |
|---|---|---|---|---|
| 3,578,378 A | * | 5/1971 | Anderson | 296/100.04 |
| 3,704,039 A | * | 11/1972 | Dean | 296/100.07 |
| 3,762,762 A | * | 10/1973 | Beveridge et al. | 296/100.07 |
| 3,785,698 A | | 1/1974 | Dean et al. | 296/137 |
| 3,923,334 A | * | 12/1975 | Key | 296/100.07 |
| 4,079,989 A | | 3/1978 | Robertson | 296/100 |
| 4,101,162 A | * | 7/1978 | Koehn | 296/100.1 |
| 4,124,247 A | * | 11/1978 | Penner | 296/100.07 |
| 4,261,611 A | * | 4/1981 | Barry et al. | 296/100.07 |
| 4,324,429 A | | 4/1982 | Wilson et al. | 296/100 |
| 4,598,940 A | * | 7/1986 | DeGroat | 292/108 |
| 4,824,162 A | * | 4/1989 | Geisler et al. | 296/100.09 |
| 4,832,394 A | * | 5/1989 | Macomber | 296/100.06 |
| 5,104,175 A | * | 4/1992 | Enninga | 296/100.1 |
| 5,322,336 A | * | 6/1994 | Isler | 296/100.18 |
| 5,632,522 A | | 5/1997 | Gaitan et al. | 296/100 |
| 5,685,593 A | * | 11/1997 | O'Connor | 296/100.03 |
| 5,688,017 A | | 11/1997 | Bennett | 296/100 |
| 5,957,525 A | | 9/1999 | Nelson | 296/165 |
| 5,971,446 A | | 10/1999 | Lunney, II | 286/100.08 |
| 5,988,728 A | * | 11/1999 | Lund et al. | 296/100.08 |
| 6,042,173 A | * | 3/2000 | Nett | 296/100.06 |
| 6,053,558 A | * | 4/2000 | Weldy et al. | 296/100.17 |
| 6,109,681 A | | 8/2000 | Edwards et al. | 296/100.02 |
| 6,149,220 A | * | 11/2000 | Weldy et al. | 296/100.06 |
| 6,221,290 B1 | | 4/2001 | Waddington et al. | 264/45.3 |
| 6,234,559 B1 | * | 5/2001 | Block et al. | 296/100.06 |
| 6,273,491 B1 | | 8/2001 | Bath et al. | 296/100.01 |
| 6,309,005 B1 | * | 10/2001 | Priest et al. | 296/100.06 |
| 6,322,128 B1 | * | 11/2001 | Karrer | 296/100.06 |
| 6,343,828 B1 | * | 2/2002 | Young et al. | 296/100.06 |
| 6,382,700 B2 | * | 5/2002 | Young et al. | 296/100.06 |
| 6,439,639 B1 | * | 8/2002 | Branting | 296/100.09 |
| 6,439,640 B1 | * | 8/2002 | Wheatley | 296/100.18 |
| 6,447,045 B1 | * | 9/2002 | Dickson et al. | 296/100.07 |

\* cited by examiner

*Primary Examiner*—Kiran Patel
(74) *Attorney, Agent, or Firm*—Price & Adams

(57) ABSTRACT

A hard cover is easily installed, removed, replaced, and inspected on the open bed of a pickup truck. The hard cover is a unitary thermoformed sheet material mounted on a rail frame assembly secured to side walls of the truck bed. The hard cover is hingedly connected by a bar fastened to the cover and extending into a slot of a bracket connected to the frame assembly. The bar is pivotal on the bracket to move the cover between open and closed positions over the bed of the pickup truck. The hinged connection of the bar to the bracket is released by manually disconnecting the bar from the cover, permitting the bar to be released from the bracket only after the bar is disconnected from the cover.

20 Claims, 8 Drawing Sheets

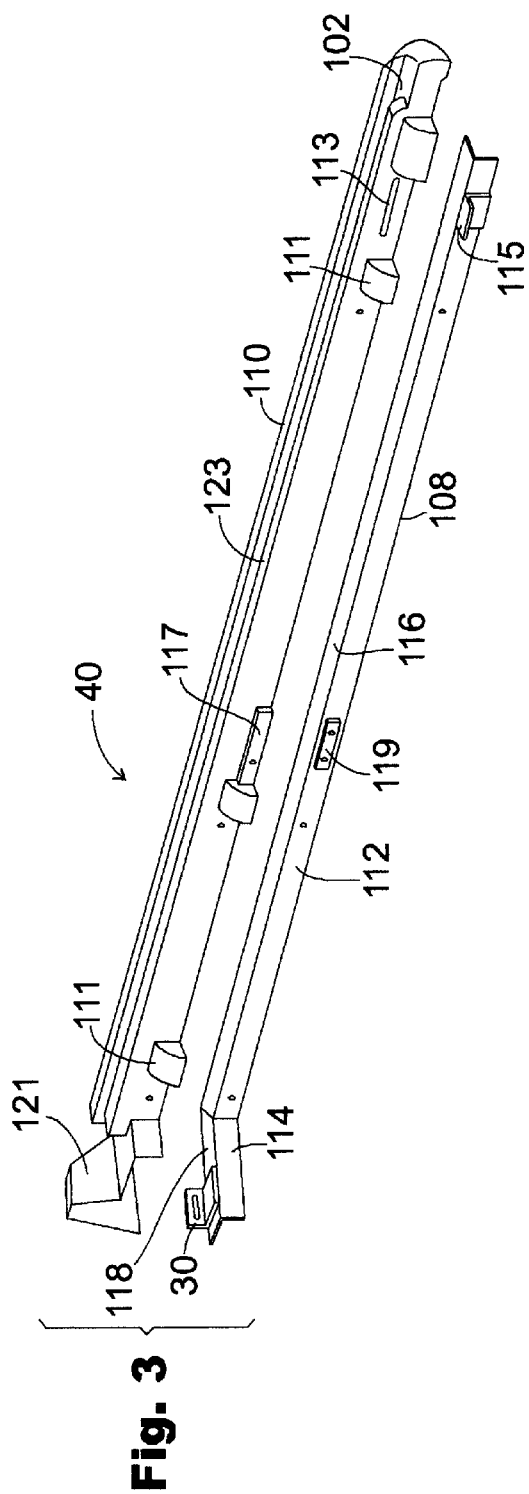
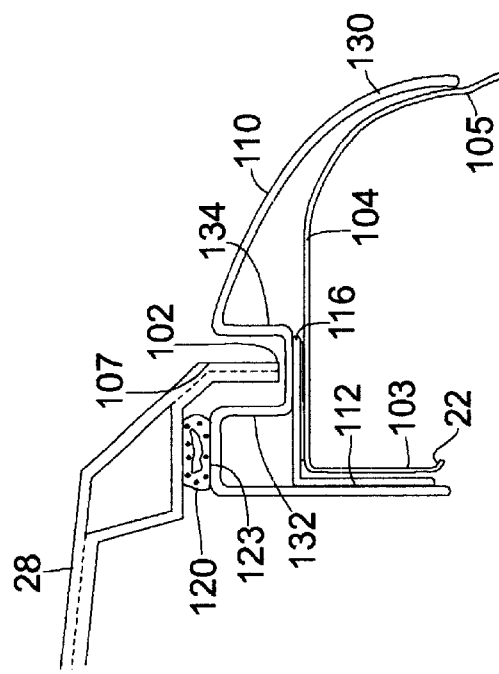
Fig. 3
Fig. 4

RIGID COVER ASSEMBLY FOR A PICKUP TRUCK

SUBSTITUTE SPECIFICATION

This application is a continuation-in-part of non-provisional application Ser. No. 09/785,835 filed Feb. 20, 2001 abandoned, entitled "Hard Truck Bed Cover" of provisional application No. 60/185,852 filed Feb. 29, 2000.

CROSS REFERENCE TO RELATED APPLICATIONS

BACKGROUND OF THE INVENTION

1. Field of the Invention

This invention relates to a tonneau cover releasably attached to a bed of a pickup truck and, more particularly, to rigid cover assembly releasably attached and pivotally mounted above the bed of a pickup truck.

2. Description of the Prior Art

Pickup truck vehicles are used for both work-related activities and personal transportation. A pickup truck cargo bed provides carrying space for both work-related and personal cargo. In order to prevent cargo carried inside the cargo bed from being damaged by weather or from being stolen, protective covers are commonly installed to cover the open cargo bed.

As pickup truck vehicles are used for a variety of purposes, it is often desirable to remove the hard cover from the pickup truck for an open cargo bed. Typical configurations allow the hard cover to be removed from a frame assembly mounted on the truck sidewalls and provide a partially open cargo bed. Alternately, the hard cover and frame assembly are removed for a completely open cargo bed.

Fiberglass molded covers in particular have been used extensively in recent years for the above noted purposes. The fiberglass molded cover is typically unitary in construction and requires a number of mechanical systems for proper operation upon the cargo bed of the pickup truck.

U.S. Pat. Nos. 4,079,989 and 5,688,017 disclose frame assemblies that include fiberglass molded covers, a hinge apparatus that opens and closes the fiberglass molded cover for access to the cargo bed, a lock apparatus to secure the fiberglass molded cover in a closed position, and a counter balance apparatus to support the fiberglass molded cover in an open position. The frame assembly is typically attached to the cargo bed by tool-operated clamps, and the hard cover is attached to the frame assembly in a secondary operation.

U.S. Pat. No. 5,688,017 also discloses a permanently mounted cover. The fasteners must be repeatedly removed and reinstalled, which results in wear on the fiberglass composite structures.

U.S. Pat. No. 5,957,525 discloses a hinge apparatus that includes a moving hinge part attached to the hard cover and a fixed hinge part that is mounted to the frame assembly. The moving hinge part is typically rotated to a vertical orientation where it is disengaged from the fixed hinge part. The fiberglass molded cover is rotated into a substantially perpendicular (or vertical) position, relative the cargo bed. The hard cover is released from the frame assembly at the hinge apparatus. Such hinge apparatus is referred to as "rotate to release" hinge apparatus within the industry.

U.S. Pat. No. 6,109,681 discloses a fixed bracket and a frame assembly. The bracket receives a tab extending from the hard cover in a position between a cover front wall and a passenger cabin. The bracket receives a moving tab to rotate the hard cover between open and closed positions.

U.S. Pat. No. 4,324,429 discloses a bracket and a tab. The bracket is connected to the cover, and the tab is connected to the frame assembly.

U.S. Pat. No. 3,785,698 also discloses an assembly having a "rotate to release" hinge. The "rotate to release" hinge assemblies have a critical limitation. The thickness of the cover is limited by the distance between the end of the cabin and the point of rotation of the cover.

U.S. Pat. Nos. 5,632,522, 5,971,446, 6,221,290 and 6,273,491 disclose complicated and costly hinges that facilitate the removal of the thermoplastic hard cover for an open cargo bed.

In addition, rigid and heavily weighted hard covers also suffer from improper alignment. Metal hinge hardware may bend and distort when the hinge is cyclically loaded from repeated rotation of the cover. Misaligned covers also abrade painted surfaces of the cargo bed. Improper sealing due to misaligned covers introduces rainwater, cleaning fluids, pollens, dust, debris and mud into the cargo bed. Also, misaligned covers are also more likely to fail catastrophically.

There is need for a "no-drill" and a "no-tool" method of attaching a hard cover to a pickup truck bed. The "no-drill" and "no-tool" method should be easy to use and convenient to allow operator access to an open truck bed and to close the truck bed when desired. The tonneau cover should be fabricated of a thermoformed material that is efficiently engaged to a rail assembly above the truck bed to simplify removal and reinstallation of the cover. In addition, the equipment for installing the hard cover must be securely engaged on the pickup truck to assure safe operation.

SUMMARY OF THE INVENTION

In accordance with the present invention there is provided a rigid cover assembly for a pickup truck having a cabin and an open bed defined by a front wall and two opposing side walls. A frame assembly includes a front rail member detachably positioned on the front wall and a pair of side rail members detachably positioned on the side walls. A rigid cover is movable between an open position providing access to the bed and a closed position on the frame and forming a top for covering the bed in the closed position. A bracket having a slot is releasably connected to the front wall. A bar having a tabbed end portion is inserted in the slot to releasably connect the bar to the bracket. The bar also includes a flat end portion having a pair of bores therethrough. A manually adjustable fastening mechanism is retained on the cover above the open bed and extends through the bores to releasably connect the bar to the cover. With the bar tabbed end portion positioned in the bracket slot, the cover is pivotally movable with the bar between the open and closed positions.

Further in accordance with the present invention, there is provided a rigid cover assembly for a pickup truck having a cabin and an open bed defined by a plurality of walls. A frame has a plurality of members detachably positioned on the walls. A bracket having a slot is connected to one of the frame members. A rigid cover is supported by the frame and movable between an open position and a closed position for covering the bed and having a front section with a recess. A bar has a tabbed end portion inserted in the slot to releasably connect the bar to the bracket and a flat end portion having a bore therethrough and positioned in the cover front section recess. A manually adjustable fastening mechanism releasably connects the bar to the cover with bar tabbed end portion positioned in is the bracket slot for pivotal movement of the cover with the bar between the open and closed positions.

Further in accordance with the present invention, there is provided a rigid cover assembly for a pickup truck having a cabin and an open bed defined by a plurality of walls. A frame having a plurality of members is detachably positioned on the walls. A bracket having a slot is detachably connected to one of said members. A rigid cover is movable between an open position and a closed position on the frame and forms a top for covering the bed in the closed position. A bar has a tabbed end portion inserted in the slot to releasably connect the bar to the bracket and a flat end portion. Means is provided for releasably attaching the bar flat end portion to the cover with the bar tabbed end portion positioned in the bracket slot for pivotal movement of the cover with the bar between the open and closed positions.

A principal object of the present invention to provide a pivotally supported hard cover releasably connected to a cargo bed of a pickup truck.

Another object of the present invention is to provide tonneau cover hinge apparatus that does not require holes to be drilled in the cargo bed or the cover for attachment of the cover to the bed.

A further object of the present invention to provide a hard cover assembly for a pickup truck that is easily installed and removed above the cargo bed of a pickup truck without the use of tools.

An additional object of the present invention is to provide for a hard cover on the cargo bed of a pickup truck a frame assembly that remains installed on a cargo bed while the hard cover is removed to permit access to an open cargo bed.

Another object of the present invention is to provide a semi-flexible and lightweight tonneau cover for the cargo bed of a pickup truck where the cover is manually connected free of tools to the cargo bed.

An additional object of the present invention is to provide a hard cover for the cargo bed of a pickup truck where the cover is securely, pivotally connected to the cargo bed and releasably disengaged from the cargo bed by hand without the use of any tools.

These and other objects of the present invention will be more completely disclosed and described in the following specification, accompanying drawings, and appended claims.

BRIEF DESCRIPTION OF DRAWINGS

FIG. 3 is an isometric exploded view of a passenger side rail frame assembly for attachment to the hard cover.

FIG. 4 is a fragmentary sectional view in side elevation of a side wall of the pickup truck and a perimeter lip of the hard cover, illustrating the connection of the perimeter lip to the channel of the rail frame assembly shown in FIG. 3 on the side wall.

DESCRIPTION OF THE PREFERRED EMBODIMENTS

Figure 1:
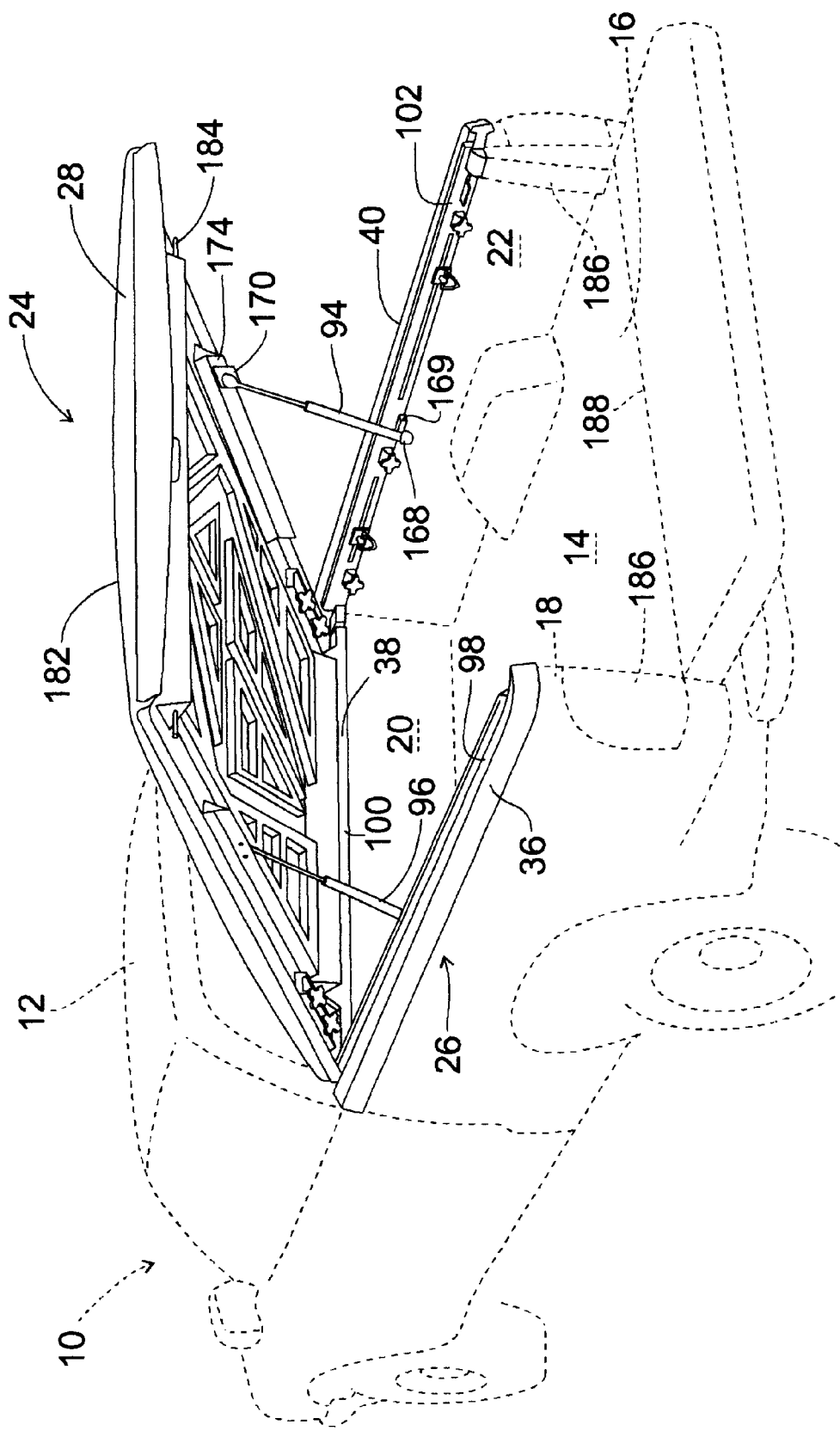
FIG. 1 is a perspective view of a hard cover in an open position on the cargo bed of a pickup truck.

Referring to the drawings and particularly to FIG. 1, there is illustrated in phantom a pickup truck generally designated by the numeral 10. The pickup truck includes a cabin 12, a flat bed 14, and an open cargo area 16. The cargo area 16 is defined by the flat bed 14 and a plurality of side walls 18, 20, and 22 extending upwardly from the bed 14.

Figure 2:
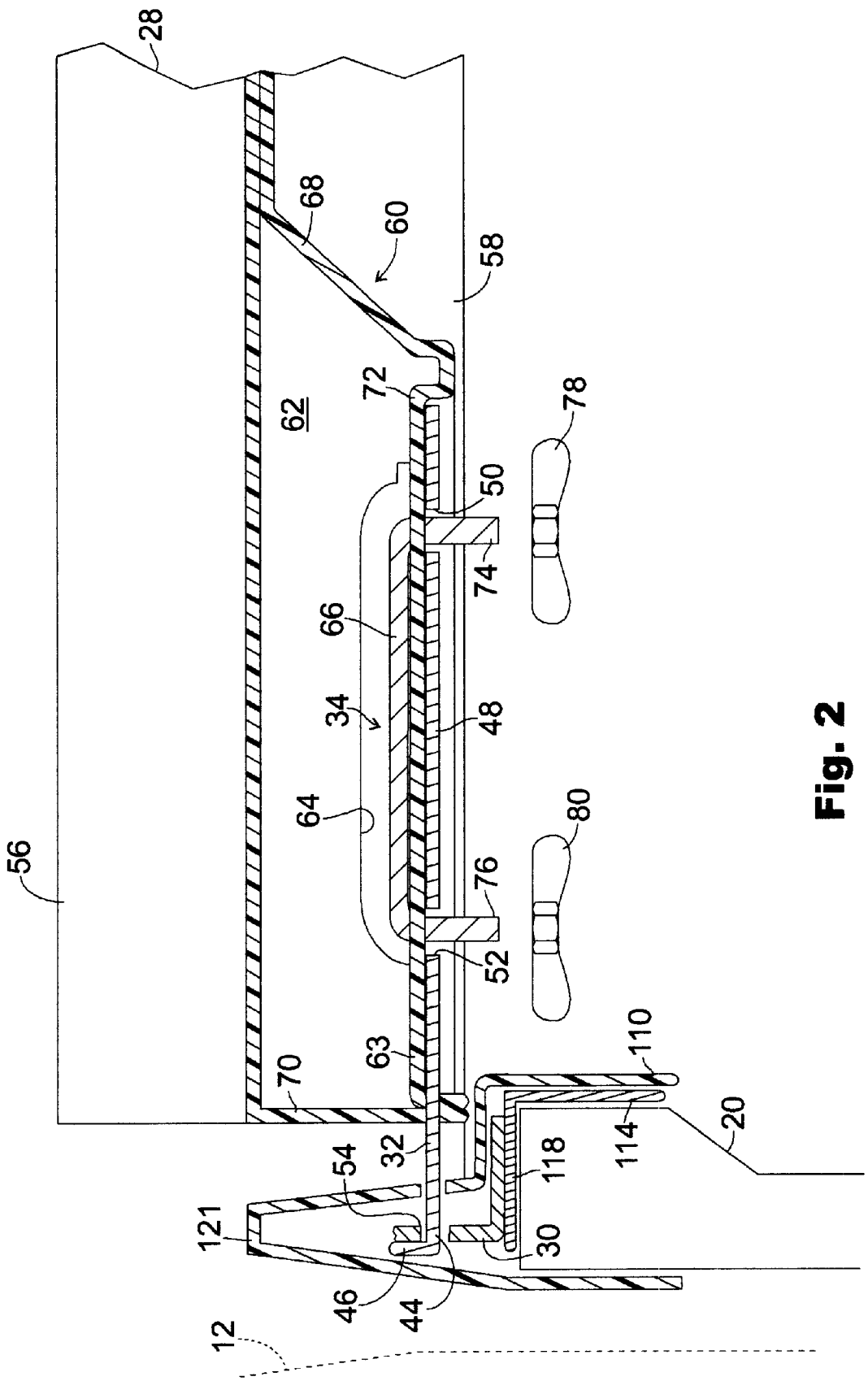
FIG. 2 is a fragmentary sectional view in side elevation of a front wall of the pickup truck cargo bed, illustrating a hinge connection of the hard cover to the front wall.

In accordance with the present invention, a cover assembly generally designated by the numeral 24 is pivotally mounted on the side walls 18, 20, and 22 to move between open and closed positions above the cargo area 16. The cover assembly 24 is supported by a rail frame assembly generally designated by the numeral 26 on the side walls 18, 20, and 22. The cover assembly 24 includes a rigid thermoformed cover 28. As shown in FIG. 2, a hinge bracket 30, a hinge bar 32, and a manually adjustable fastening mechanism 34 releasably engage the cover assembly 24 to the side walls of the pickup truck above the cargo bed 14. The rail frame assembly 26, as shown in FIG. 1 and FIGS. 10–12, includes a plurality of elongated rail members 36, 38, and 40 detachably mounted on top of the side walls 18, 20, and 22, respectively, of the truck cargo area 14.

The rigid cover 28 mounted on the side walls is pivotal between an open position, shown in FIG. 1, and a closed position, shown in FIG. 2. The open position provides easy access to the bed 14; while, the closed position prevents access to the bed 14. The cover 28 pivots from the open position (FIG. 1) to the closed position (FIG. 2) and vice versa. In the closed position, the cover 28 fastens to the rail frame assembly 26 and thereby encloses the open bed 16. In this manner any contents positioned on the bed 14 are secured.

Referring to FIG. 2, the cover 28 is a thermoformed sheet which attaches to the rail frame assembly 26 through the fastening mechanism 34, which is retained on the inside surface of cover 28, hinge bracket 30, and the hinge bar 32. The bracket 30 is immovably secured to the front rail member 38 of the frame assembly 26 which is mounted on the front wall 20 of the truck. The bracket 30 is operable as a fixed hinge component. The bar 32 is L-shaped and includes a tabbed end portion 44 having an extended tab 46 and an elongated flat end portion 48 having spaced apart holes 50, 52. The tab 46 extends through a slot 54 in the bracket 30, as shown in phantom in FIG. 5. The fastening mechanism 34 retainer on the cover 28 extends through the holes 50, 52 in the bar 32 to releasably receive and thereby attach the bar 32 to the cover 28. With the bar 32 attached to the cover 28 and the tab 46 positioned in the bracket slot 54, the bar 32 rotates relative to the fixed hinge bracket 30. In this respect the bar 32 operates as a moving hinge component.

The cover 28, as shown in FIG. 2, includes a top section 56 and a bottom section 58. Preferably, the hard cover 28 is thermoformed and fabricated of thermoplastic materials. Other alternative materials suitable for fabrication of the cover 28 include thermosetting plastic in a composite with fiberglass, metal, and other man-made materials.

As shown in FIG. 2, the cover bottom section 58 includes a molded platform generally designated by the numeral 60 for receiving the hinge bar 32 and includes a recessed portion 64 positioned adjacent to a longitudinal edge of the cover 28. The recessed portion 64 extends from a front wall 68 to an end wall 70 between side walls 62 and a bottom wall 63. The dimension of the recessed portion 64 corresponds to the length of the flat end portion 48 of the bar 32. A shoulder 72 protrudes from the front cover wall 68 to receive the end of the bar flat end portion 48.

The platform 60 shown in FIG. 2 is positioned substantially horizontally when the cover 28 is closed. In the closed position, the flat end portion 48 of the bar 32 is received in the recessed portion 64 in a position substantially perpendicular to the bracket 30.

The fastening mechanism 34 includes in one embodiment a U-shaped connector 66 positioned above bottom wall 63 having projecting stud threaded end portions 74, 76. Studs 74, 76 releasably engage the respective ends of the U-shaped connector 66 and include threaded ends which extend through holes 50, 52 in the hinge bar 32. Individual threaded bolts and like fastening devices are used in place of the U-shaped connector 66 to connect the hinge bar 32 to the cover 28. The threaded ends of studs 74, 76 are engaged by hand-operated fasteners, such as wing nuts 78, 80 and the like, to releasably connect the bar 32 to the cover 28. With this arrangement the bar 32 is restrained from moving relative to the cover 28 when the cover 28 is pivoted between the open and closed positions. Also, the tab 46 remains in the hinge bracket slot 54 during the pivotal movement of the cover 28.

In operation, tightening nuts 78, 80 on the studs 74, 76 of fastener 66 seats the hinge bar 32 within the recessed portion 64 of the cover 28. The U-shaped fastener 66 with the wing nuts 78, 80 facilitate hand connection of the cover 28 to the fixed hinge bracket 30. The combination of fastener 66 and wing nuts 78, 80 provides a "no-tool" installation. The installation is accomplished manually. A truck owner can easily manipulate the hand-operated fasteners to conveniently remove, replace, and inspect the hard cover assembly. This is accomplished by the releasable connection of the hinge bar 32 to the cover 28 and the pivotal movement of the hinge bar 32 on the hinge bracket 30.

The cover 28 is fabricated with the U-shaped fastener 66 positioned in the recessed portion 64 of the molded platform 60. The dimensions of the platform 60 are sufficient to completely receive lengthwise the fastener 66 with threaded ends of the fastener extending through the bottom wall 63 in the platform 60. The fastener ends are connected to the studs 74 and 76. The studs 74 and 76 extend through holes 50 and 52 of bar 32 to threadedly receive the wing nuts 78, 80. For ease of hand manipulation, the distance between the holes 50, 52 is greater than the length of the head of each wing nut 78, 80, permitting the wing nuts 78, 80 to be rotated without interference, as shown in FIG. 2.

In accordance with the present invention as shown in FIGS. 1 and 2, the wing nut fasteners 78, 80 are manually tightened on the U-bolt stud ends 74, 76. The stud ends 74, 76 are visible and reachable by hand from the side of the truck when the cover 28 is in an open position, supported either manually or by props 94, 96 as shown in FIG. 1. The props 94, 96 are mounted at their bases on the truck sidewalls 18 and 22 and connected at their extensible end portions to the cover 28. The fasteners 78, 80 are manually adjusted by rotation. In the preferred embodiment, fasteners 78, 80 are provided with hand knobs. The hand knobs are easily manipulated from the side of the truck without the use of tools. Manual manipulation provides quick removal of the cover 28 from the movable hinge bar 32.

The hinge bar 32 is disconnected from the cover 28 by releasing the wing nuts 78, 80 from the stud end portions 74, 76. The bar end 48 is withdrawn from the stud ends 74, 76. This releases the bar 32 from connection to the cover 28.

The cover platform 60 provides an additional benefit in high temperature environments. The thermoplastic cover 28 can deform due to creep or similar temperature induced deformation. The dynamic and static loading provided by the opening and closing of the cover can lead to deformation. However, the platform 60 radiates stress over a substantial portion of the cover 28.

As further shown in FIG. 1, the rail frame assembly 26 releasably attaches to the pickup truck sidewalls 18, 20, and 22. The rail frame assembly 26 includes three members, a front rail member 38 and two opposing side rail members 36, 40. The rail members 36, 38, 40 are molded to receive the cover 28 over the flat bed 14 and close the open bed 16. The members 36, 38, 40 include shelves 98, 100, 102 respectively to support the cover 28 in a closed position.

Now referring to FIGS. 3 and 4, there is illustrated the rail member 40, which is releasably attached to a sidewall 22. The side wall 22 includes a vertical rail portion 103, a horizontal rail portion 104, and a downwardly extending lip portion 105. As shown in FIG. 3, the rail member 40 includes sub-rail frame 108 and an exterior frame 110. The sub-rail frame 108 includes side panels 112, 114 and top panels 116, 118. The side panel pairs 112, 116 and 114, 118 are connected at a right angle. The side panel 112 and top panel 116 of rail frame 108 are positioned in overlying relation with truck side wall rail portion 103 and 104, respectively. The slotted fixed hinge bracket 30 is immovably fixed to the side panel 112 and is mounted to receive the tabbed end 44 of the bar 32.

The exterior frame 110 shown in FIGS. 3 and 4 is made from molded thermoplastic and is shaped to overlie the sub-rail frame 108 and receive the cover 28. The exterior frame 110 releasably attaches to the sub-rail frame 108 and overlies the fixed hinge bracket 30, as shown in FIG. 2. As shown in FIG. 4, the frame 110 includes a channel 102 that receives a down turned lip 107 of hard cover 28 when closed. Channel 102 also acts as a rain gutter to channel water away from the inside of the truck bed 14. The channel 102 is open toward the front and rear of the vehicle to enable the run-off of water. The molded rail frame 110 also includes a plurality of clamp positioning pockets 111, a slot 113 to receive a lock bracket 115, a fixed prop bracket emboss 117 to accommodate prop bracket block 119, and an elevated pocket 121 to receive the opposed ends of the front wall member 38.

As further illustrated in FIG. 4, cover 28 rests upon flexible sealing member or gasket 120. Sealing member 120 compresses against a ledge 123 of the exterior frame 110 when the cover 28 is closed, forming a water resistance seal. The lip 107 of cover 28 extends into the U-shaped channel 120 when the cover 28 is closed. In the preferred embodiment, the width of the channel 102 is substantially greater than the width of the lip 107. The substantial difference in width allows the lip 107 to rest in the channel 102 without touching an inside wall 132 or an outside wall 134 of the channel 102. However, the dimensions of the lip 107 and channel 102 are not critical. From the channel wall 134, the frame 110 extends in a down turned lip 130 which is molded to conform to the contour of the lip portion 105 of the truck side wall 22. In this manner, the plastic rail frame 110 has the appearance of being an integral part of the truck bed 14.

Figure 5:
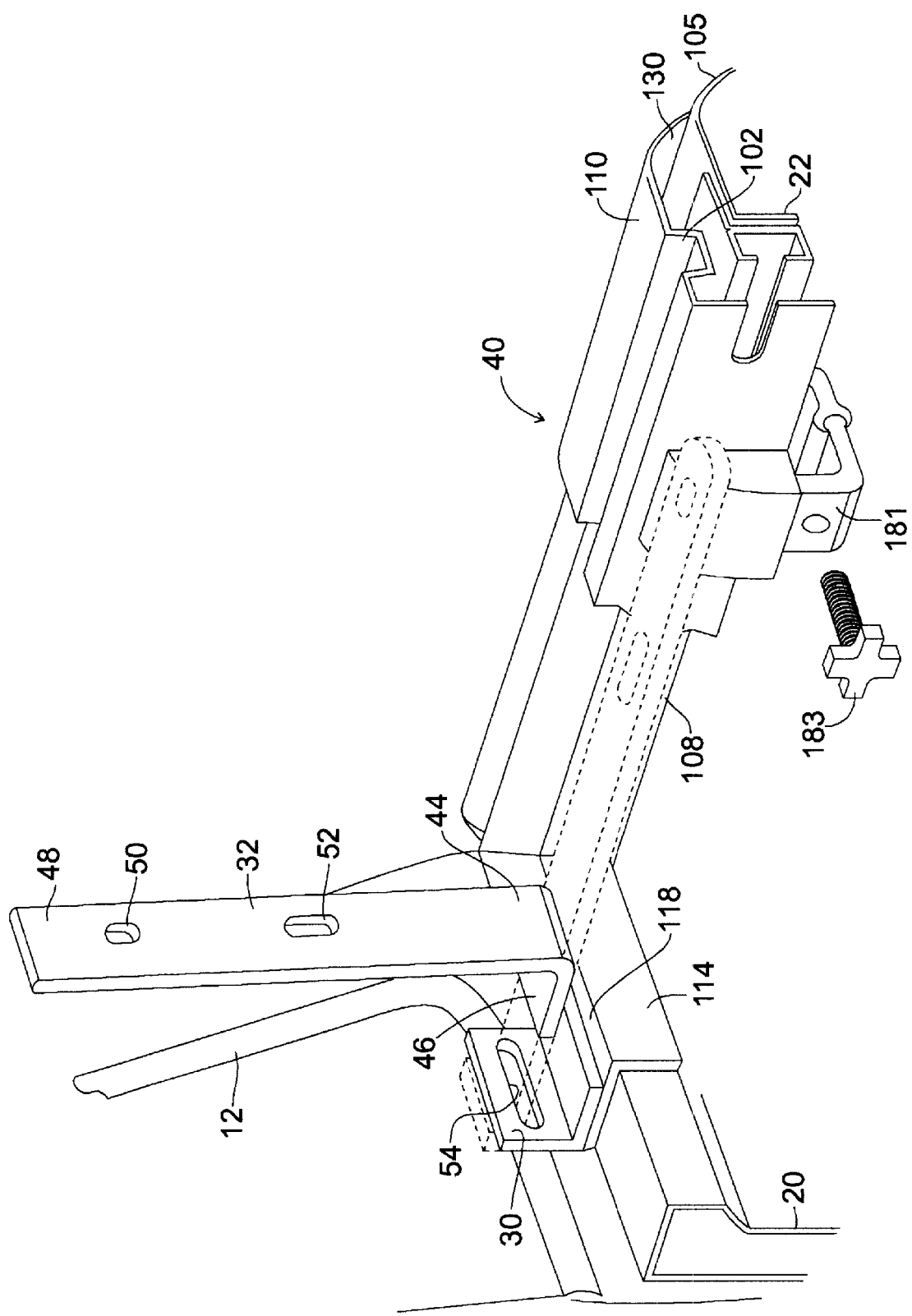
FIG. 5 is a fragmentary perspective view of the hinge apparatus of the hard cover, illustrating the pivotal positions of a hinge bar.

Now referring to FIG. 5, the movable hinge bar 32 is illustrated as a substantially L-shaped flat rectangle member formed by the end portion 48 and tabbed end portion 46. However, the shape of bar 32 and the respective end portions 46 and 48 is not critical as long as the tabbed end portion 46 is shaped to be received in slot 54 of hinge bracket 30. This assures that the end portion 46 is releasably engagable with the bracket 30.

In accordance with the present invention, the extended end 48 of the bar 32 has a predetermined length that allows the end 48 to be visible and accessible when in the horizontal position, as shown in phantom in FIG. 5. The extended length of the bar 32 enables a user to manually attach and detach the bar 32 on the cover 28 without the use of tools. The predetermined length and position of flat end 48 of bar 32 allows manipulation of wing nuts 78 and 80 on the threaded ends of the studs 74, 76 extending from U-bolt 66 when the bar 32 is in an upright position. The cover 28 is supported manually or by props 94, 96, as shown in FIG. 1, in an upright position.

Figure 6:
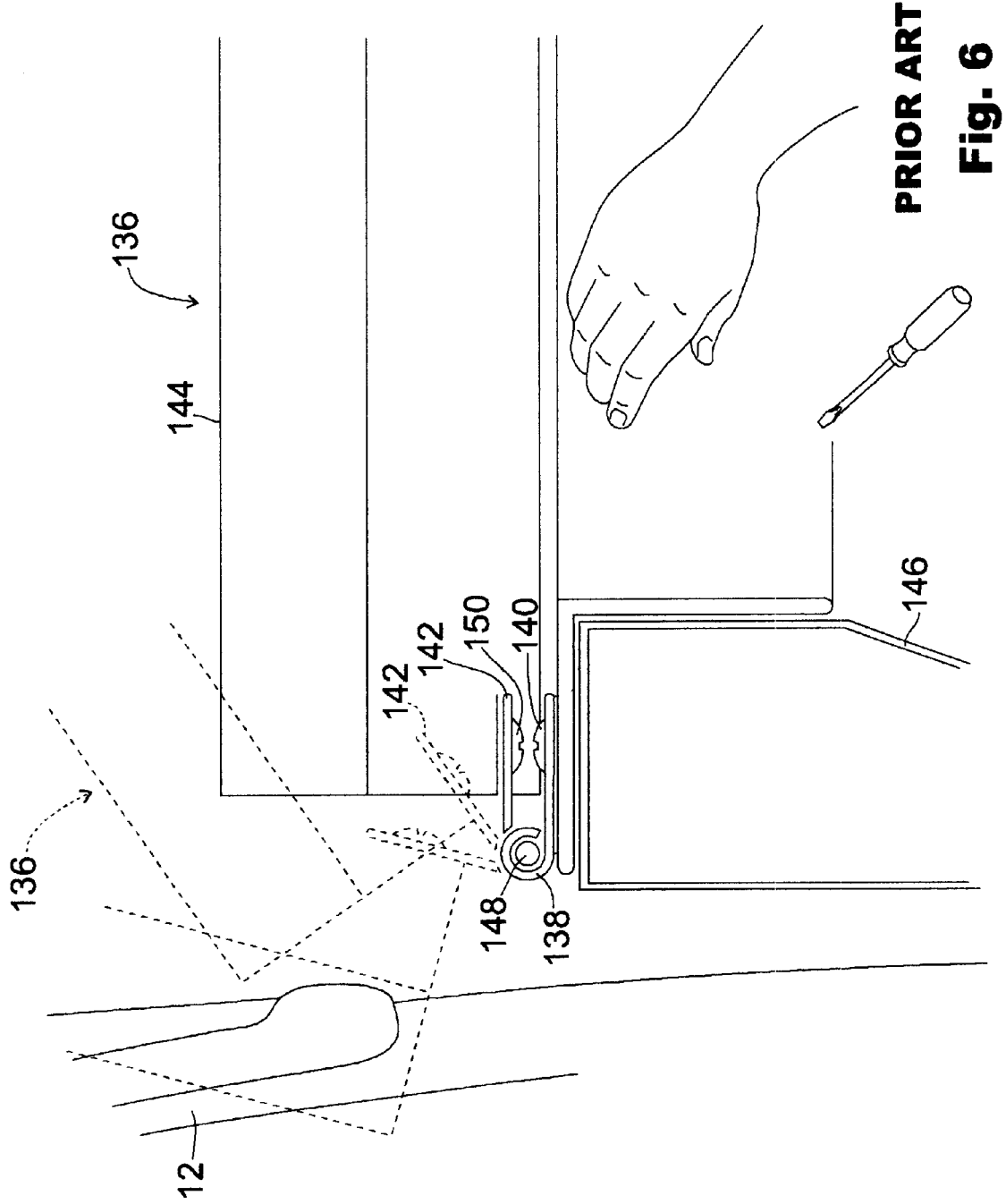
FIG. 6 is a fragmentary sectional view in side elevation of a prior art release hinge mounted on the truck side wall, illustrating pivotal movement of a cover assembly about the hinge.

FIG. 6 illustrates a prior art mechanism for pivotally connecting a hard cover assembly 136 over the bed of a pickup truck by a conventional butt piano hinge 138. The piano hinge 138 includes a fixed hinge portion 140 and a movable hinge portion 142. The hinge 138 pivotally connects a hard cover 144 to a side wall frame 146 of the truck. The fixed hinge portion 140 is connected to the frame 146. The movable hinge portion 142 is attached to the cover 144. As shown in FIG. 6, the thickness of the cover 144 is limited by the distance between the cabin 12 and pivot point 148 of the hinge 138.

As shown in FIG. 6, cover 144 cannot have a thickness greater than the distance between the cabin 12 (or the end wall) and the pivot point 148. The movable hinge portion 142 attaches by a fastener 150, such as a screw, to the cover 144. However, the fastener 150 cannot be manually adjusted by hand or by a screwdriver when the cover 144 is attached to the side wall frame 146 because of the limited space available under a raised cover. Even in the raised position, as shown in phantom in FIG. 6, insufficient clearance is provided between the raised cover 144 and frame 146 to obtain access to rotate the fastener 150 by hand or by a tool.

Figure 7:
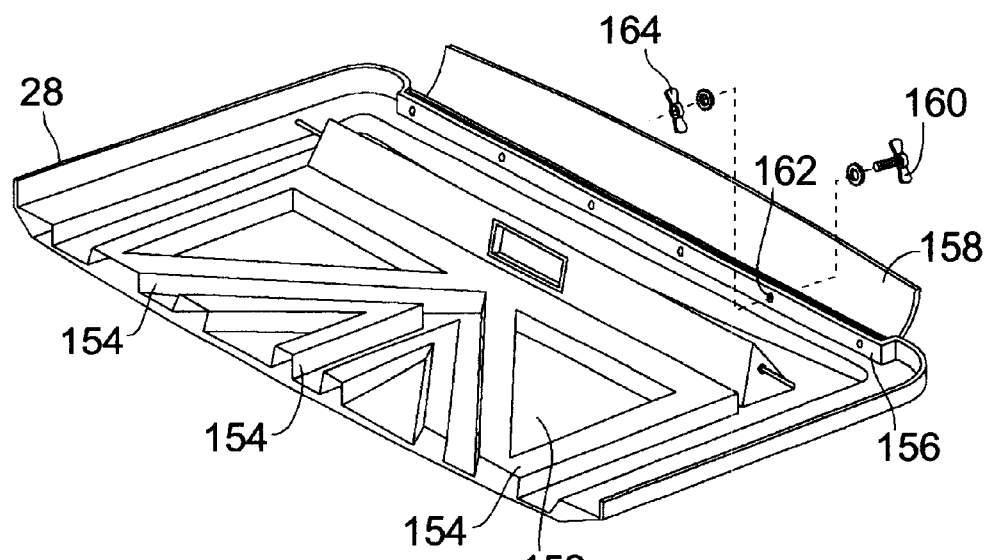
FIG. 7 is an isometric view of the hard cover, illustrating the inside structure of the hard cover.

Referring now to FIG. 7, an underside 152 of the cover 28 is shown in more detail. The underside includes raised sections or ribs 154. The cover 28 also includes a back wall 156 and downwardly extending tailgate member 158. The tailgate member 158 attaches to the back wall 156 through conventional fastening devices. For example, a plurality of thumbscrews 160 are inserted through corresponding pre-drilled holes 162, which align when the tailgate member 158 is in contact with the back wall 156 for assembly. Thumb-nuts 164 are threaded onto the thumbscrews 160 to complete the attachment of the back wall 156 to the tailgate member 158.

Figure 8:
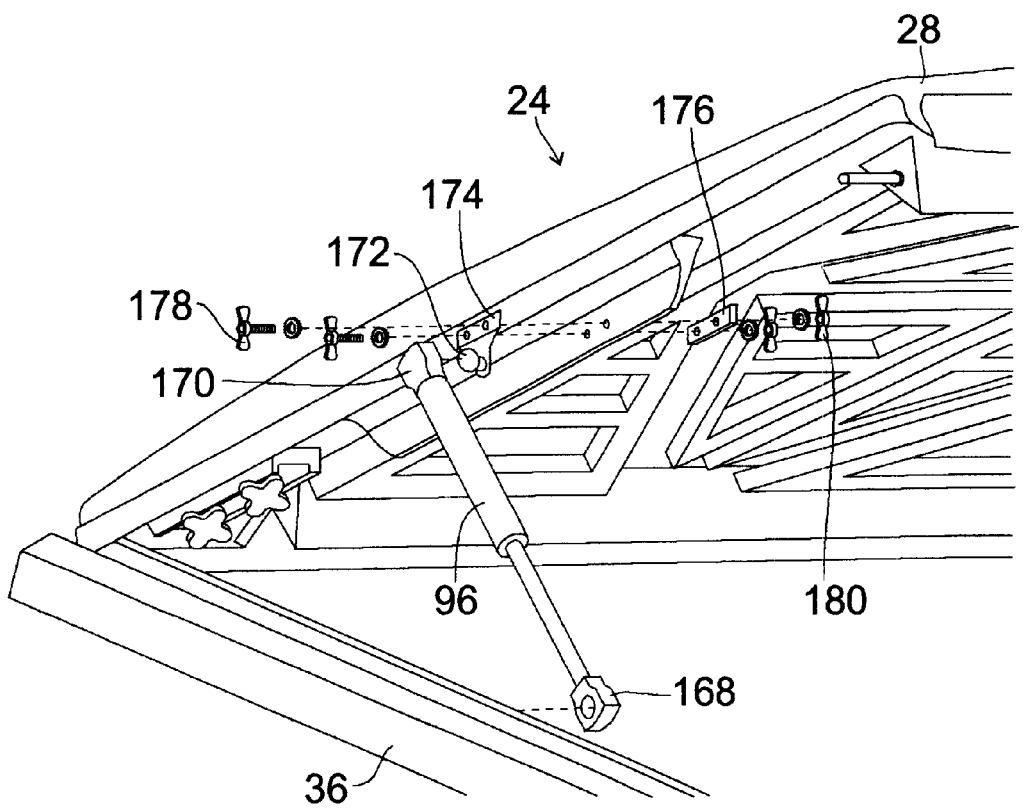
FIG. 8 is a fragmentary isometric view of the hard cover shown in FIG. 1, illustrating prop components for supporting the hard cover in an open position above the cargo bed.

Now referring to FIGS. 1 and 8, there is illustrated the connection of props 94 and 96 to the cover 28 and side rail members 36 and 40 through conventional fastening devices. As shown in FIG. 8, the prop 96 has ball sockets 168, 170 at its end portions. The ball socket 170 engages a stud 172, which is supported by a bracket 174. Bracket 174 attaches to cover 28 with rear piece 176, the thumbscrews 178 and thumbnuts 180. As shown in FIG. 1 the opposite end of prop 94 on side wall 22 includes ball socket 168 which is connected to a prop bracket 169 attached to the side rail member 40. Prop 96, shown in FIG. 8, is attached to side rail member 36 on side wall 18 in a similar manner.

As shown in FIGS. 1 and 8, the cover 28 is supported by props 94, 96 when the cover is in an open position. The cover 28 is maintained in the closed position by a lock assembly (not shown) located on a top surface 182 of the cover 28. A lock handle (not shown) actuates locking means 184 generally adjacent tailgate pillars 186 beside a tailgate opening 188. The props 94, 96 also support the cover in the open position to provide easy access to cargo. The props 94, 96 also allow easy access to the fastening mechanism 34 and the bar 32.

Figure 9:
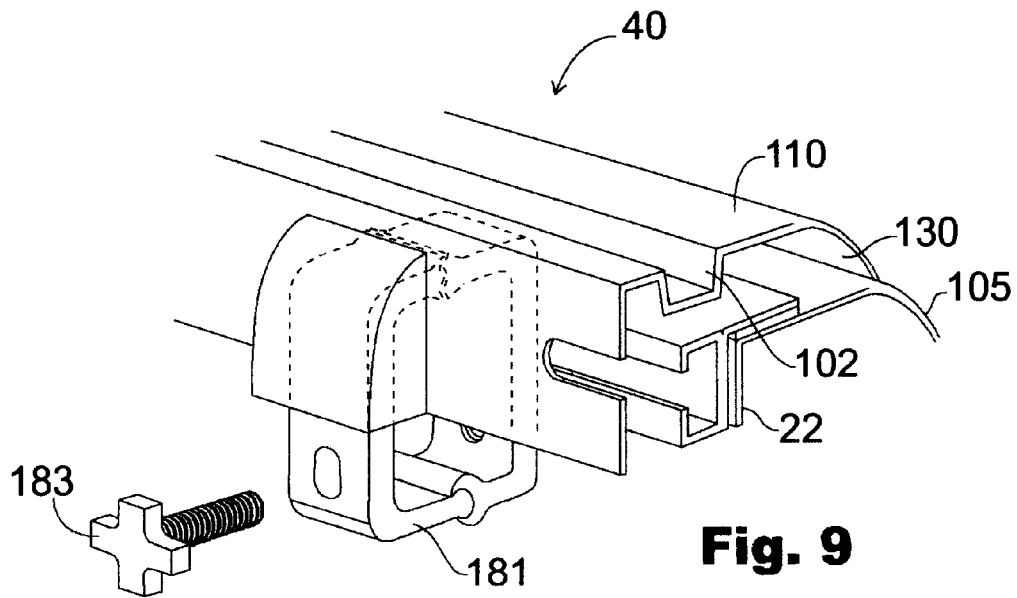
FIG. 9 is a fragmentary isometric view of the clamped connection of the rail frame assembly to the truck side wall.
Figure 10:
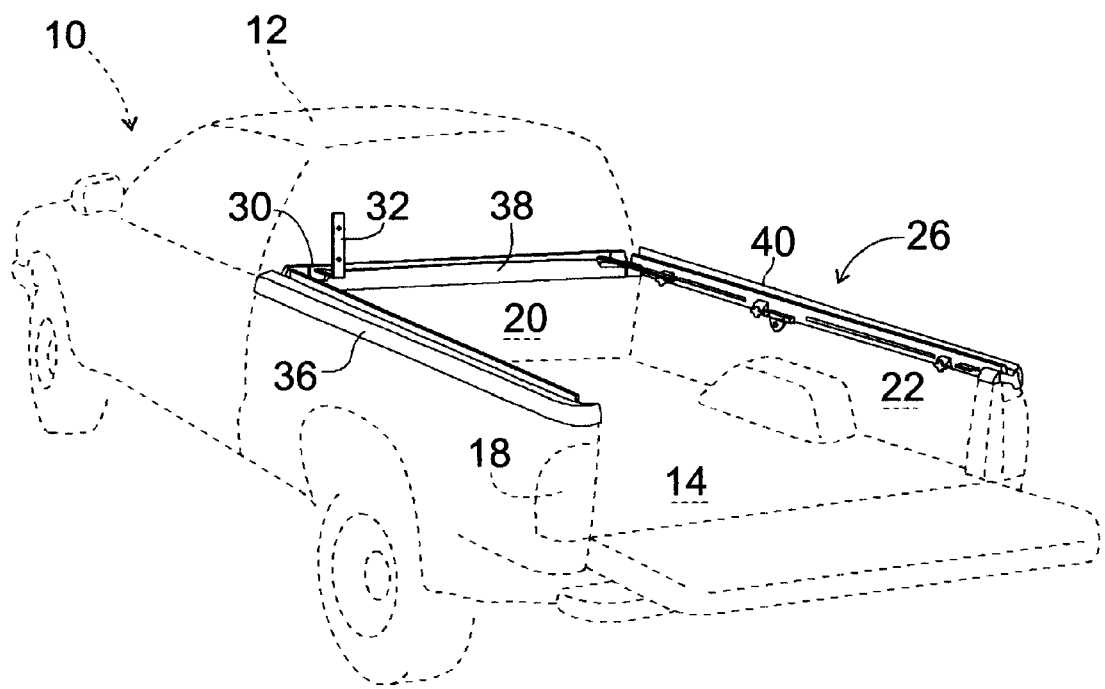
FIG. 10 is a perspective view of the cargo bed of a pickup truck, illustrating the hinge bar attached to the rail frame assembly mounted on the truck side walls.
Figure 11:
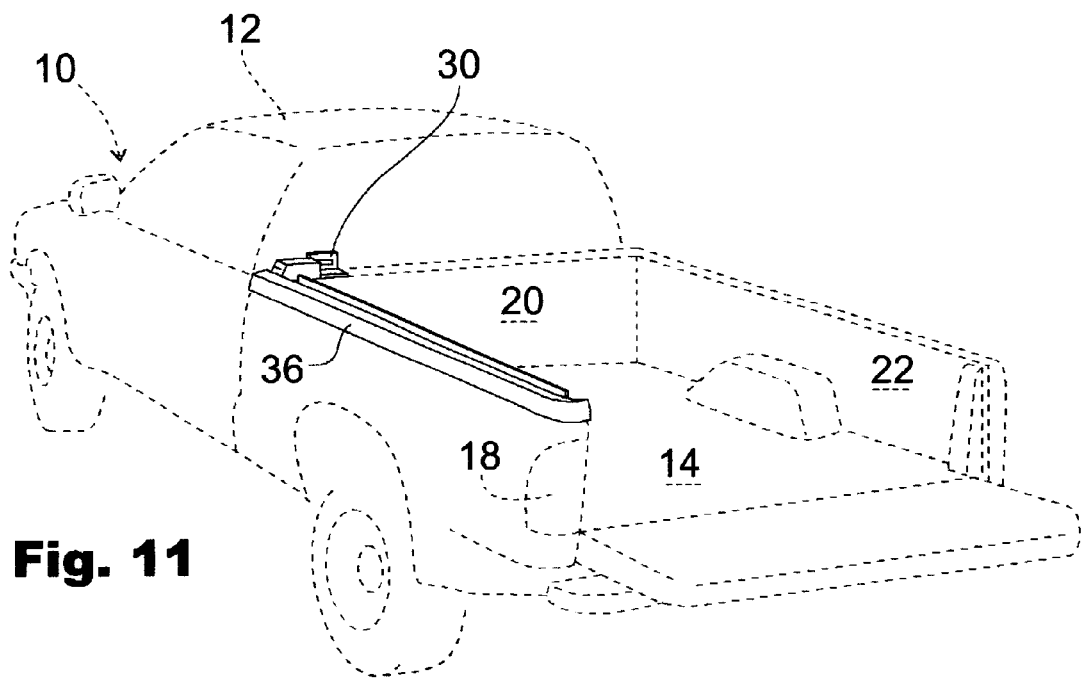
FIG. 11 is a perspective view similar to FIG. 10, illustrating the driver side rail frame positioned on a truck side wall.
Figure 12:
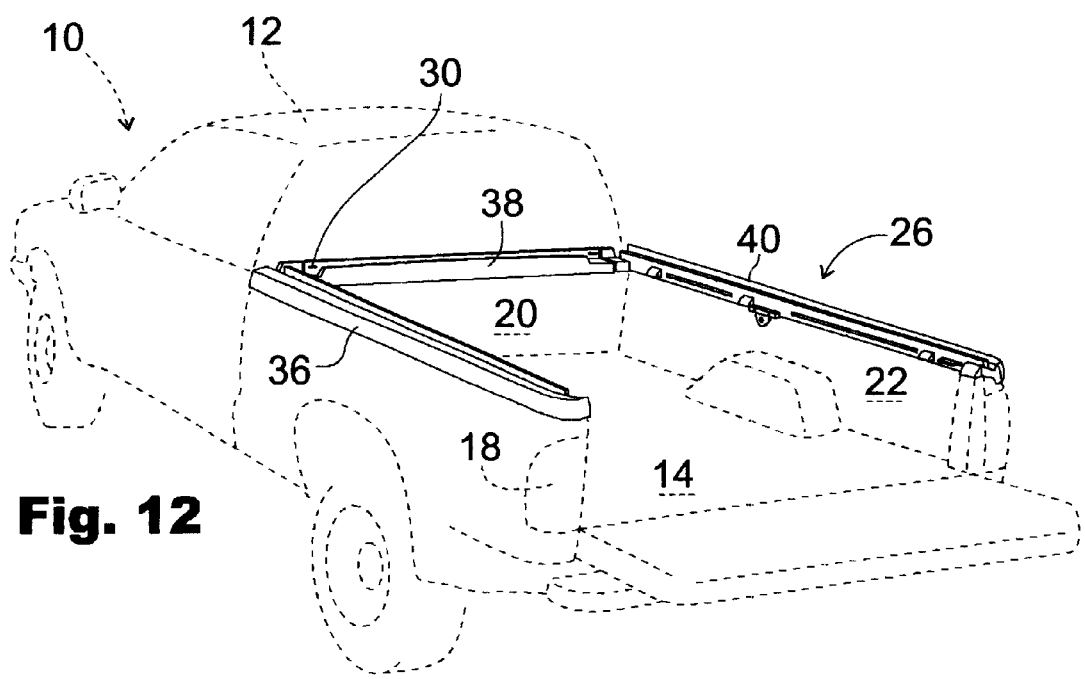
FIG. 12 is a perspective view similar to FIG. 10, illustrating the complete rail frame assembly mounted on the truck side walls.

Referring now to FIGS. 10–12, there is illustrated the installation of the rail frame assembly 26 on the truck side walls. Elongated side rail member 36 is detachably connected to the sidewall 18 of the pickup truck 10, as shown in FIG. 11. As shown in FIG. 9, the attachment of side rails 36 and 40 is accomplished by a clamp 181. A manually adjustable knob 183 engages and disengages the clamp 181 to the side wall 18 and 22 without the need for tools. As shown in FIG. 12, front rail member 38 and side rail member 40 are installed in a similar manner to truck sidewalls 20 and 22, respectively.

Pivotal engagement of the movable hinge bar 32 to the fixed hinge bracket 30 is shown in FIGS. 5 and 10. The bar 32 is releasably attached to the bracket 30 closely adjacent to the truck side wall 18 for ease of no-tool assembly and disassembly of the cover 28 over the truck bed 14. The bar 32 is pivotally movable about fixed hinge bracket 30 between a vertical position and a horizontal position, as shown in FIG. 5. The positioning of the bar 32 adjacent to the side wall facilitates attachment of the cover 28 to the bracket 30. In the vertical position shown in FIG. 10, the flat end 48 of the bar 32 is substantially perpendicular to the flat bed 14. The tab 46 extending from tabbed end portion 44 of the bar 32 is inserted through the hinge slot 54 in the bracket 30. The tab 46 slides through the slot 54 until the flat elongated end portion 48 is sufficiently close to the bracket 30 to allow the bar 32 to rotate. In this position the flat end 48 of the bar 32 is substantially parallel to the flat bed 14 when the bar 32 is in a horizontal position, as shown in phantom in FIG. 5. The cover 28 is in the closed position above the truck bed 14 in this position.

In accordance with the present invention, the hard cover 28 rotates between a closed position (FIG. 2) and an open position (FIG. 1) above the cargo bed 14 along the front wall 20 of the truck behind the passenger cabin 12. The degree of rotation, in one example, ranges between about 15 to 30 degrees. The open position (FIG. 1) is preferably between about 18 and 22 degrees to assure unimpeded access the full depth of the cargo bed 14.

The hard cover 28 is releasable from its hinged connection to the truck front wall 20. The hard cover 28 is pivoted to the open position (FIG. 1) to detach the hinge bar 32 from the hard cover 28. When the bar 32 is disconnected, the cover 28 is removed from the bed 14. The bar 32 is then free to rotate to the vertical position (FIG. 5). In this position, the tab 46 slides out of the slot 54 in the bracket 30. Thus, the hard cover 28 is first released from the bar 32 and then the bar 32 is released from the bracket 30. This is all accomplished by hand without the use of tools.

When the moving hinge bar 32 is engaged to the cover 28 and the fixed hinge bracket 30, the hinge bar 32 is prevented from rotating to a 90° position shown in FIG. 5, which would allow the bar 32 to disengage the bracket 30. The moving hinge bar 32 is prevented from rotating to the 90° position because the truck cabin 12 obstructs forward pivotal movement of the cover 28. The front wall of the cover 28 collides with the cabin 12 before the hinge bar 32 reaches the 90° position. The position of the prior art connection for the cover shown in phantom in FIG. 6 corresponds to the position of the cover 28 when it is pivoted upwardly into contact with the cabin 12. In other words, the cabin 12 stops pivotal movement of the cover 28 to the position where the tab 46 of bar 32 slides out of bracket slot 54 and releases the cover 28 from connection to the truck front wall 20.

In accordance with the present invention, the cover 28 is released from an open position above the truck bed 14 by disengaging the fasteners 78, 80 that connect the bar 32 to the cover 28. This is carried out manually without the use of 5 tools. When the bar 32 is disconnected from the cover 28, the bar 32 slides freely out of the bracket slot 54.

In operation, attachment of the cover 28 to the bar 32 is facilitated when the flat end portion 48 of the bar 32 is in a horizontal position. The cover 28 is aligned and the fastening mechanism 34 attaches the cover 28 to the bar 32. The thickness of the cover 28 restricts the rotation of the cover 28 and the bar 32. In the preferred embodiment, the cover 28 is positioned between 15 to 30 degrees from the horizontal plane of the flat bed 14 in the closed position. The cover 28 is positioned between 68 to 72 degrees from the horizontal plane of the flat bed in the open position.

As shown in FIG. 5, the bracket 30 is stationarily positioned on truck end wall 20. More specifically as shown in FIG. 3, the bracket 30 is connected to the top panel 118 of the sub-rail frame 108. The bracket 30 can also be mounted directly on the end wall 20 of the pickup truck 10.

According to the provisions of the patent statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. A rigid cover assembly for a pickup truck having a cabin and an open bed defined by a front wall and two opposing side walls comprising:

a frame including a front member detachably positioned on said front wall and a pair of side members detachably positioned on said side walls, a rigid cover movable between an open position providing access to said bed and a closed position on said frame and forming a top for covering the bed in the closed position, a bracket connected to said front wall, said bracket having a slot, a bar having a tabbed end portion for insertion in said slot for pivotal movement of said bar relative to said bracket to releasably connect said bar to said bracket and a flat end portion including a pair of bores, and a manually adjustable fastening mechanism retained on said cover above the open bed and extending through said bores in said bar to releasably connect said bar to said cover with said bar tabbed end portion positioned in said bracket slot for pivotal movement of said cover with said bar between the open and closed positions.

2. The rigid cover assembly as set forth in claim 1 in which:

said manually adjustable fastening mechanism includes a connector extending from said cover to receive said bar.

3. The rigid cover assembly as set forth in claim 2 in which:

said connector is a U-bolt having threaded end portions extending from said cover.

4. The rigid cover assembly as set forth in claim 2 in which:

said manually adjustable fastening mechanism includes a knob portion manually operable to engage and disengage said connector.

5. The rigid cover assembly as set forth in claim 1 in which:

said bar is L-shaped where said tabbed end portion extends perpendicular to said flat end portion.

6. The rigid cover assembly as set forth in claim 5 in which:

said flat end portion of said bar is substantially longer than said tabbed end portion of said bar.

7. The rigid cover assembly as set forth in claim 1 in which:

said bracket is fixed to said frame on said front wall, and said tabbed end portion of said bar extends through said slot in said bracket for pivotal movement of said bar on said frame.

8. The rigid cover assembly as set forth in claim 1 in which:

said cover has a top section, and the thickness of said top section is greater than the distance between said bracket and said cabin to limit pivotal movement of said cover between the open and closed positions on said frame.

9. The rigid cover assembly as set forth in claim 1 in which:

said bracket is connected to said frame front member and mid slot in said bracket is positioned above said front member to receive said bar tabbed end portion.

10. The rigid cover assembly for a pickup truck having a cabin and an open bed defined by a plurality of walls comprising:

a frame having a plurality of members, said members detachably positioned on the walls, a bracket having a slot, said bracket connected to one of said members, a rigid cover supported by said frame and movable between an open position and a closed position for covering said bed, said cover having a front section with a recessed portion, a bar having a tabbed end portion releasably inserted in said bracket slot for pivotal movement of said bar relative to said bracket and a flat end portion having a bore therethrough and positioned in said cover recessed portion, and a manually adjustable fastening mechanism retained in said cover recessed portion above the open bed to releasably connect said bar to said cover with said bar tabbed end portion positioned in said bracket slot for pivotal movement of said cover with said bar between the open and closed positions.

11. The rigid cover assembly as set forth in claim 10 in which:

said flat end of said bar includes the bore, and said fastening mechanism including a connector extending through said bore to secure said bar to said cover.

12. The rigid cover assembly as set forth in claim 11 in which:

said connector is a U-bolt having threaded end portions extending from said cover.

13. The rigid cover assembly as set forth in claim 10 in which:

said fastening mechanism includes a fastening portion and a knob portion, and said fastening portion extending through said bore in said bar for connection to said knob portion to secure said bar to said cover.

14. The rigid cover assembly as set forth in claim 10 in which:

said bar is L-shaped where said tabbed end portion extends perpendicular to said flat end portion.

15. The rigid cover assembly as set forth in claim 14 in which:

said flat end portion of said bar is substantially longer than said tabbed end portion of said bar.

16. The rigid cover assembly as set forth in claim 10 in which:

said bracket is fixed to said frame on said front wall, and said tabbed end portion of said bar extends through said slot in said bracket for pivotal movement of said bar on said bracket.

17. The rigid cover assembly as set forth in claim 10 in which:

said cover has a top section, and the thickness of said top section is greater than the distance between said bracket and said cabin to limit pivotal movement of said cover between the open and closed positions on said frame.

18. The rigid cover assembly as set forth in claim 10 in which:

said recessed portion is integrally molded in said cover to receive said bar flat end portion.

19. The rigid cover assembly for a pickup truck having a cabin and an open bed defined by a plurality of walls comprising:

a frame having a plurality of members detachably positioned on said walls, a bracket having a slot, said bracket connected to one of said members, a rigid cover movably between an open position and a closed position on said frame and forming a top for covering said bed in the closed position, a bar having a tabbed end portion for insertion in said slot to releasably connect said bar to said bracket and a flat end portion, and means for releasably attaching said bar flat end portion to said cover with said bar tabbed end portion positioned in said bracket slot for pivotal movement of said cover with said bar between the open and closed positions.

20. The rigid cover assembly as set forth in claim 19 in which:

said means for releasably attaching said bar flat end portion to said cover includes a manually operable fastener for hand connection and release of said bar to said cover to facilitate engagement and disengagement of said bar to said bracket for mounting said cover on said frame free of the use of tools.

* * * * *